No. 615,738. Patented Dec. 13, 1898.
E. NUGENT.
CANOPY SUPPORTER.
(Application filed Feb. 10, 1898.)

(No Model.)

WITNESS
P. McComb.
M. G. McClean

INVENTOR
Edward Nugent.
BY
Clark &c.
ATTORNEYS

UNITED STATES PATENT OFFICE.

EDWARD NUGENT, OF NEWARK, NEW JERSEY.

CANOPY-SUPPORTER.

SPECIFICATION forming part of Letters Patent No. 615,738, dated December 13, 1898.

Application filed February 10, 1898. Serial No. 669,759. (No model.)

*To all whom it may concern:*

Be it known that I, EDWARD NUGENT, a citizen of the United States, and a resident of Newark, county of Essex, and State of New Jersey, have invented certain new and useful Improvements in Canopy-Supporters, of which the following is a specification, reference being had to the accompanying drawings, forming a part thereof, in which similar letters of reference indicate corresponding parts.

This invention relates to an improved canopy-supporter for baby-carriages; and the object thereof is to provide a simple and inexpensive device which may be folded and stored away under the seat of the carriage when not in use.

The invention will be hereinafter fully described, and specifically set forth in the annexed claims.

Figure 1:
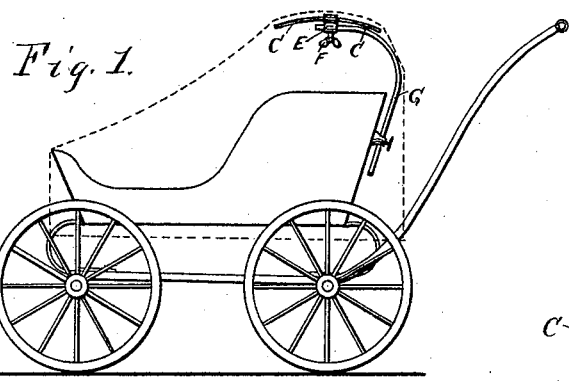
Figure 2:
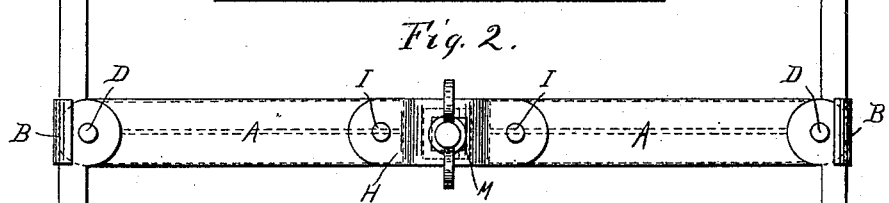
Figure 3:
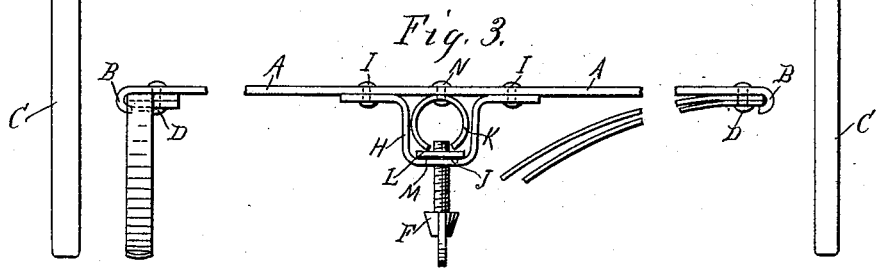
Figure 4:
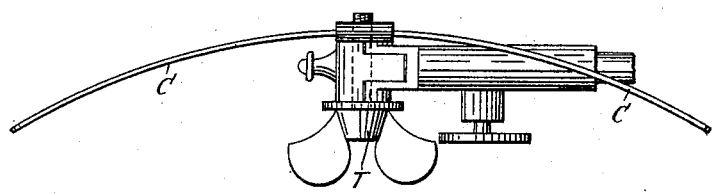
Figure 5:
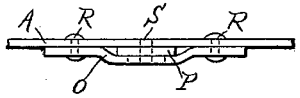

In the accompanying drawings, Figure 1 is a side elevation of the device in operative position on an ordinary baby-carriage. Fig. 2 is an inverted plan view of the device detached from the rod. Fig. 3 is a side elevation of the same, portions of the spreader being broken out. Fig. 4 is an end view of a modification of the device mounted on a sunshade-holder. Fig. 5 is a side elevation of the central section of the said modification.

In the practice of my invention I employ a cross-bar or spreader A, preferably of sheet metal. The outer ends B B of said spreader are curved downwardly and inwardly to act as a check to the arms C C, also of sheet metal, and pivoted to the spreader A by means of the rivets D D. Centrally located upon the under side of said spreader are the clamp E and thumb-screw F, adapted to hold the device firmly upon the end of the rod G, in common use on baby-carriages. Said clamp E embodies the outer shell H, secured to the spreader by means of rivets I I and having its central portion depressed and of a convenient size for the insertion of the nut J and nut-lock K. Said nut is preferably square in form and has an enlarged flange L upon its inner side, the object of said flange being to prevent its passage outwardly through the hole M in the shell H, said hole M being of a size suitable to receive said nut and of a shape adapted to prevent said nut from turning within said hole. The nut-lock K is a split cylinder in form, secured to the spreader by means of the rivet N. Its points on lower side contact with the upper surface of the nut and prevent it from backing out of the hole M. Through said nut J the thumb-screw F is adapted to thread and contact with the rod G when said rod is entered in the hole formed by the walls of the nut-lock K.

Any desired form of canopy may be thrown over the device and over the outside of the baby-carriage, the device serving to support said canopy and prevent it from falling upon the face or body of the child.

When not in use, the device is unclamped from the rod, its arms swung around to the position shown by dotted lines in Fig. 2, and stowed away under the seat of the carriage.

Some carriages of this class being supplied with a rod having a holder mounted upon the end thereof, said holder adapted to clamp the handle of a sunshade, a modification of the clamp above described is necessary and provided by the device shown in Figs. 4 and 5. In this instance the nut-lock K is dispensed with entirely, the spreader A acting as the nut-lock, and the clamp O, slightly depressed in its central portion and provided with a hole receiving the smaller portion of the nut P, takes the place of the shell H in Fig. 3. Said clamp O is secured to the spreader A by means of the rivets R R, and a hole S through clamp-nut and spreader is adapted to receive the thumb-screw T, which is provided with a suitable thread and is adapted to pass upwardly through the clamp of a sunshade-holder, as shown in Fig. 4. The remainder of the device does not differ from that shown in Fig. 2.

It is obvious that the sheet-metal parts of the clamp may be dispensed with and a single casting be used in its place; but the device as shown is preferred at this time.

Having thus described my invention, what I claim as new, and desire to secure by Letters Patent, is—

1. A canopy-supporter for baby-carriages, embodying a spreader, arms pivotally attached to the ends thereof, the ends of said spreader being bent backwardly and adapted to prevent the extension of said arms beyond a right-angular position, and a clamp adapted to secure said spreader upon the shade-rod of the carriage, substantially as shown and described.

2. A canopy-supporter for baby-carriages, embodying a spreader, arms pivotally attached to the ends thereof, and a clamp consisting of an outer shell fixed to said spreader, a nut fixed to said shell in a hole adapted to prevent its turning, a nut-lock fixed to said spreader and adapted to prevent displacement of the nut, and a thumb-screw adapted to thread through said shell, nut and nut-lock and contact with the shade-rod of a carriage, substantially as shown and described.

In testimony that I claim the foregoing as my invention I have signed my name, in presence of two witnesses, this 27th day of January, 1898.

EDWARD NUGENT.

Witnesses:
SAMUEL MCDOUGALL,
JOHN MCDOUGALL.